(12) United States Patent
Shiratake et al.

(10) Patent No.: US 7,236,035 B2
(45) Date of Patent: Jun. 26, 2007

(54) SEMICONDUCTOR DEVICE ADAPTED TO MINIMIZE CLOCK SKEW

(75) Inventors: Shinichiro Shiratake, Yokohama (JP); Yukihito Oowaki, Yokohama (JP); Fumitoshi Hatori, Yokohama (JP); Mototsugu Hamada, Yokohama (JP); Hiroyuki Hara, Fujisawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 44 days.

(21) Appl. No.: 10/990,537

(22) Filed: Nov. 18, 2004

(65) Prior Publication Data

US 2006/0061401 A1     Mar. 23, 2006

(30) Foreign Application Priority Data

Sep. 17, 2004 (JP) ............... 2004-271919

(51) Int. Cl.
*G06F 1/04* (2006.01)
(52) U.S. Cl. .................. 327/291; 327/295
(58) Field of Classification Search ........... 327/291, 327/295, 161–163, 144–146
See application file for complete search history.

(56) References Cited

U.S. PATENT DOCUMENTS

| | | | | |
|---|---|---|---|---|
| 6,049,239 A | * | 4/2000 | Eto et al. ............... | 327/158 |
| 6,323,714 B1 | | 11/2001 | Naffziger et al. ........ | 327/295 |
| 6,342,796 B2 | * | 1/2002 | Jung ..................... | 327/141 |
| 6,356,158 B1 | * | 3/2002 | Lesea .................... | 331/11 |
| 6,452,432 B2 | * | 9/2002 | Kim ...................... | 327/158 |
| 6,765,976 B1 | * | 7/2004 | Oh ........................ | 375/376 |

FOREIGN PATENT DOCUMENTS

JP        2001-274341        10/2001

OTHER PUBLICATIONS

U.S. Appl. No. 10/990,537, Nov. 18, 2004, Shiratake et al.
U.S. Appl. No. 11/342,617, Jan. 31, 2006, Fujita et al.

* cited by examiner

*Primary Examiner*—Timothy P. Callahan
*Assistant Examiner*—Hai L. Nguyen
(74) *Attorney, Agent, or Firm*—Oblon, Spivak, McClelland, Maier & Neustadt, P.C.

(57) ABSTRACT

A first logic circuit has its supply voltage controlled. A second logic circuit operates in response to an external clock signal. An adjustment circuit includes a first delay circuit supplied with the external clock signal, and a detection circuit which detects a skew between timing of a first clock signal output from the first logic circuit and a second clock signal output from the second logic circuit section. The adjustment circuit adjusts the delay time of the first delay circuit according to the result of the detection by the detection circuit and applies an output signal of the first delay circuit to the first logic circuit as a third clock signal.

19 Claims, 8 Drawing Sheets

SEMICONDUCTOR DEVICE ADAPTED TO MINIMIZE CLOCK SKEW

CROSS-REFERENCE TO RELATED APPLICATIONS

This application is based upon and claims the benefit of priority from prior Japanese Patent Application No. 2004-271919, filed Sep. 17, 2004, the entire contents of which are incorporated herein by reference.

BACKGROUND OF THE INVENTION

1. Field of the Invention

The present invention relates to a semiconductor device which has two or more system modules which operate in synchronization with a clock signal and more specifically to a semiconductor device which is adapted to compensate for skew in the clock signal which drives the system modules.

2. Description of the Related Art

Conventionally, a system on silicon chip (SoC) includes two or more system modules different in computing function. These system modules are interconnected by a system bus for data communications among them. Further, the system modules are each controlled by an interrupt control signal produced by another module.

Suppose, for example, that there are a first system module which processes audio data and a second system module which processes image data. Then, the first and second system modules will be different in computing speed. In general, audio data is smaller in data amount than image data; therefore, it is not required for the audio data processing first system module to have a computing speed higher than that in the image data processing second system module. In addition, in some cases there is no need to process audio data while image data is being processed. That is, although the second system module needs to be placed in the operating state at all times, the first system module may be placed in the standby state. For this reason, the second system module is directly supplied with an external supply voltage VCC, but the first system module is supplied, as required, with an internal voltage VINT lower than the external supply voltage VCC.

The first and second system modules are supplied with an external common clock signal CLK. The first and second system modules each contain a logic circuit section, which includes two or more flip-flop and latch circuits. These circuits are clocked by the clock signal. If the arrival times of the clock signal at the flip-flop and latch circuits are displaced, that is, if there is a skew in the clock signals, data in the flip-flop and latch circuits cannot be transferred correctly. This causes malfunction of the logic circuit section.

In general, the timing of change of data with respect to change of the clock signal is designed with setup and hold time margins added. If skew in the clock signals in the whole system exceeds the setup and hold time margins, malfunction of the logic circuit section is caused. For this reason, buffer circuits or delay elements are inserted in paths over which the clock signal propagates in order to make uniform the arrival times of the clock signal at the flip-flop and latch circuits even if the lines over which the clock signal are propagated differ in length and load capacitance.

As described above, the internal voltage VINT applied to the audio data processing first system module is set lower than the external supply voltage VCC. The internal voltage VINT is produced by a stepdown circuit embedded in a chip. Depending on the operating conditions of the stepdown circuit, the internal voltage VINT may vary. The operating conditions of the stepdown circuit include temperature, process conditions, and the value of current dissipated by the first system module. When the internal voltage VINT is high, the propagation speed of the clock signal in the first system module increases and vice versa.

In general, skew in two or more clock signals which are driven with different supply voltages is greater than that in clock signals driven with the same supply voltage. For this reason, a problem arises in that skew in the clock signal in the whole system will increase according to variations in the internal voltage VINT.

As a related technique, there is a technique which provides two or more zones on an integrated circuit with clock buffers adapted to delay a reference clock signal in time and involves comparing zone clock signals output from the clock buffers in adjacent zones through a phase comparator and controlling the amount of delay introduced by the clock buffer in a particular zone according to a control signal produced by the phase comparator (see, for example, Jpn. Pat. Appln. KOKAI Publication No. 2001-274341).

BRIEF SUMMARY OF THE INVENTION

According to a first aspect of the present invention, there is provided a semiconductor device comprising: a first logic circuit which has its supply voltage controlled; a second logic circuit which operates in response to an external clock signal; an adjustment circuit including a detection circuit and a first delay circuit supplied with the external clock signal, the detection circuit detecting a skew between timings of a first clock signal output from the first logic circuit and a second clock signal output from the second logic circuit and the adjustment circuit adjusting the delay time of the first delay circuit according to the result of the detection by the detection circuit and applying an output signal of the first delay circuit to the first logic circuit as a third clock signal.

According to a second aspect of the present invention, there is provided a semiconductor device comprising: a first logic circuit which has its supply voltage controlled and outputs a first clock signal; a second logic circuit which outputs a second clock signal; a first adjustment circuit including a first detection circuit and a first delay circuit supplied with an external clock signal, the first detection circuit detecting a skew between timings of the first clock signal output from the first logic circuit and a reference clock signal and the adjustment circuit adjusting the delay time of the first delay circuit according to the result of the detection by the first detection circuit and applying an output signal of the first delay circuit to the first logic circuit as a third clock signal; and a second adjustment circuit including a second detection circuit and a second delay circuit supplied with the external clock signal, the detection circuit detecting a skew between timings of the second clock signal output from the second logic circuit and the reference clock signal and the second adjustment circuit adjusting the delay time of the second delay circuit according to the result of the detection by the second detection circuit and applying an output signal of the second delay circuit to the second logic circuit as a fourth clock signal.

DETAILED DESCRIPTION OF THE INVENTION

The preferred embodiments of the present invention will be described hereinafter with reference to the accompanying drawings.

[First Embodiment]

Figure 1:
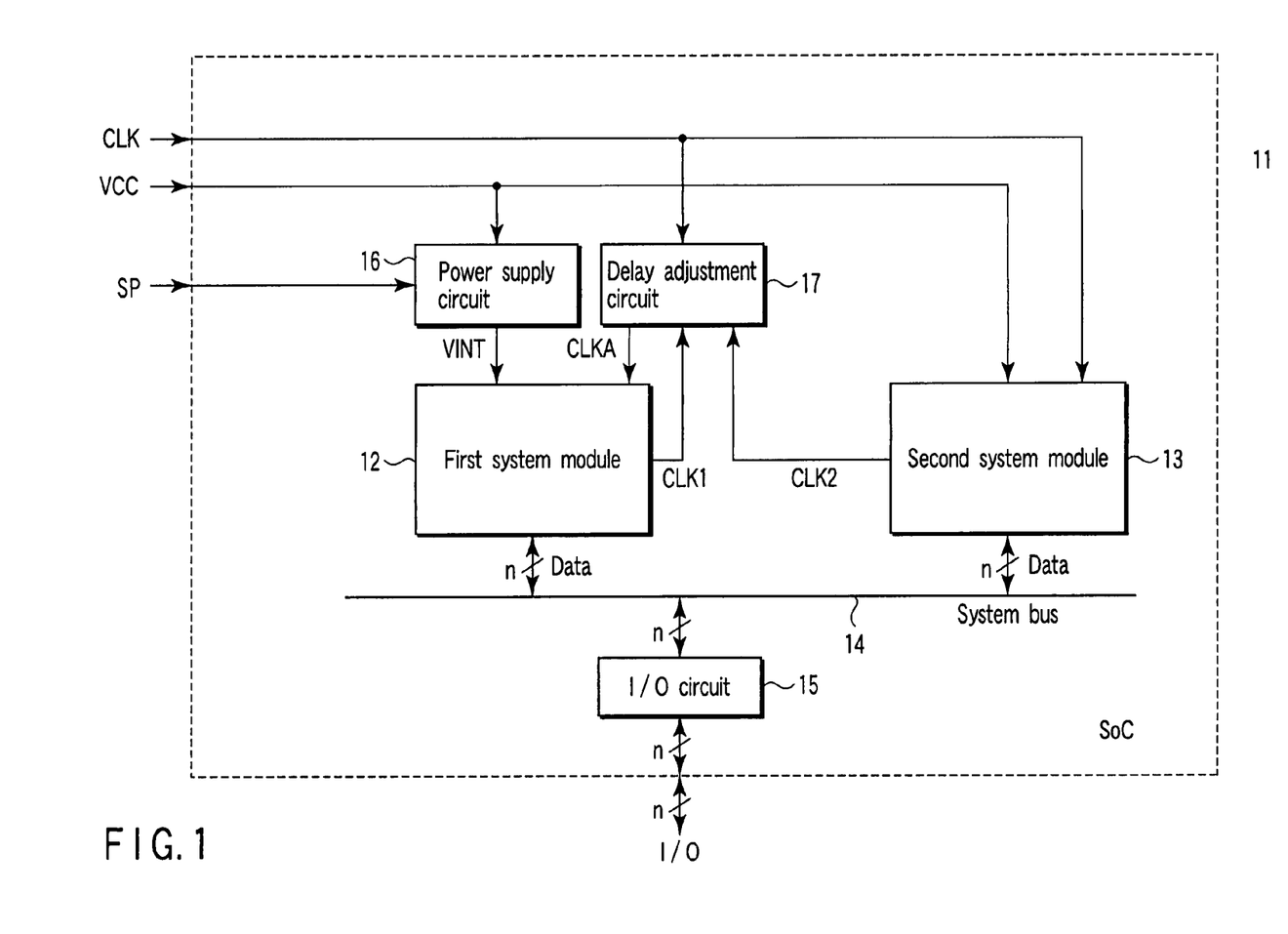
FIG. 1 is a schematic block diagram of a first embodiment of the present invention.
Figure 2:
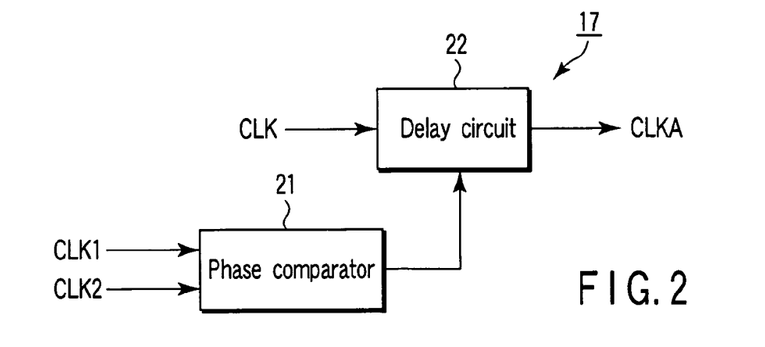
FIG. 2 is a block diagram of the delay adjustment circuit shown in FIG. 1.

FIGS. 1 and 2 illustrate a first embodiment of the present invention. As shown in FIG. 1, a one-chip SoC device, indicated generally at 11, has first and second system modules 12 and 13 having different computing functions, a system bus 14, an I/O circuit 15, a power supply circuit 16, and a delay adjustment circuit 17. The first system module 12, which is a logic circuit section adapted to process audio data by way of example, includes logic circuits composed of flip-flop and latch circuits not shown. The second system module 13, which is a logic circuit section adapted to process image data by way of example, includes logic circuits composed of flip-flop and latch circuits not shown. The computing speed of the first system module 12 is set lower than that of the second system module 13. The first and second system modules 12 and 13 are interconnected by the system bus 14 over which data communications can be made between the modules. Further, each of the first and second system modules 12 and 13 is controlled by an interrupt control signal produced by the other.

The second system module 13 is directly supplied with an external supply voltage VCC and an external clock signal CLK. The second system module 13 is operated from the external supply voltage VCC and the external clock signal CLK. The first system module 12 is supplied with an internal supply voltage VINT from the power supply circuit 16 and a clock signal CLKA from the delay adjustment circuit 17. The power supply circuit 16, which is comprised of, for example, a stepdown circuit, lowers the external supply voltage VCC according to a computing speed control signal SP to produce the internal supply voltage VINT.

That is, when it is required to make the computing power of the first system module 12 relatively high, the power supply circuit 16 is controlled so that the interval voltage VINT is raised. Specifically, the power supply circuit is controlled so that the internal voltage VINT becomes approximately equal to the supply voltage VCC. When the computing power of the first system module 12 is allowed to be relatively low, on the other hand, the power supply circuit 16 is controlled so that the interval voltage VINT falls below the supply voltage VCC. Specifically, the power supply circuit is controlled so that the internal voltage VINT becomes lower than the supply voltage VCC by, for example, at least 200 mV.

The delay adjustment circuit 17 detects a skew (displacement) between timings of a clock signal CLK1 from the first system module 12 and a clock signal CLK2 from the second system module 13 and adjusts the delay time of the external clock signal CLK accordingly to produce the clock signal CLKA. That is, the delay adjustment circuit 17 detects the phase or time difference between the clock signals CLK1 and CLK2 from the first and second system modules 12 and 13 and controls the delay time of the external clock signal CLK according to the detected phase or time difference so that skew in the clock signals CLK1 and CLK2 is minimized.

When the internal voltage VINT output from the power supply circuit 16 is controlled according to the computing speed control signal SP as described above, the propagation speed of the clock signal in the first system module 12 varies, causing the time interval between the moment that the clock signal CLKA is applied to the first system module 12 and the moment that the clock signal CLK1 is output to vary. However, when the clock signal CLK1 varies, the delay time in the delay adjustment circuit 17 is adjusted so that the clock signals CLK1 and CLK2 are always in phase with each other.

FIG. 2 shows an example of the delay adjustment circuit 17. This delay adjustment circuit 17 is composed of a phase comparator 21 and a delay circuit 22. The phase comparator 21 makes a comparison in phase between the clock signals CLK1 and CLK2. As the result of comparison, when the clock signal CLK1 is advanced in phase with respect to the clock signal CLK2, the phase comparator 21 outputs a control signal to introduce a long delay time in the delay circuit 22. Consequently, the delay circuit 22 outputs the clock signal CLKA which has been delayed by a long time interval with respect to the external clock signal CLK. Thereby, the phase of the clock signal CLK1 is delayed, causing the clock signals CLK1 and CLK2 to become in phase with each other.

As the result of the comparison by the phase comparator 21, on the other hand, when the clock signal CLK1 is delayed in phase with respect to the clock signal CLK2, the phase comparator 21 outputs a control signal to shorten the delay time in the delay circuit 22. Consequently, the delay circuit 22 outputs the clock signal CLKA which has been delayed by a short time interval with respect to the external clock signal CLK. Thereby, the phase of the clock signal CLK1 is advanced, so that it becomes in phase with the clock signal CLK2.

According to the first embodiment, the phase comparator 21 detects the phase difference between the clock signal CLK1 output from the first system module 12 and the clock signal CLK2 output from the second system module 13 and the delay circuit 22 controls the phase of the external clock signal CLK according to the detected phase difference to output the clock signal CLKA. For this reason, even in the event that the operating conditions and drive voltage of the first system module 12 have changed, the clock skew in the first and second system modules 12 and 13 can be minimized. It therefore becomes possible to improve the setup/hold characteristics for data communications between the first and second system modules 12 and 13.

Moreover, the delay adjustment circuit 17 optimizes the amount of delay one or two clock cycles later, thus allowing the clock skew to be improved at high speed.

[Second Embodiment]

Figure 3:
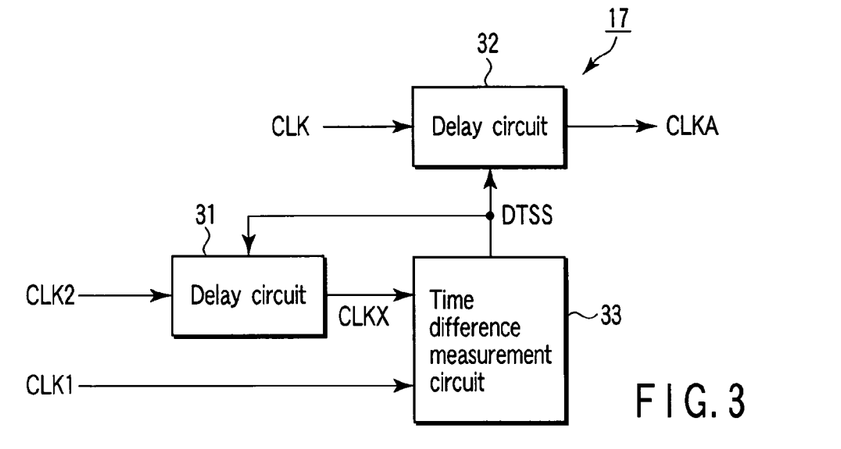
FIG. 3 is another block diagram of the delay adjustment circuit of FIG. 1 according to a second embodiment of the present invention.

FIG. 3 illustrates a second embodiment of the present invention, which is another example of the delay adjustment circuit 17 in the first embodiment.

The delay adjustment circuit 17 shown in FIG. 3 is composed of delay circuits 31 and 32 and a time difference measurement circuit 33. The delay circuit 31 delays the clock signal CLK2 output from the second system module 13 in accordance with a delay time select signal (DTSS) from the time difference measurement circuit 33 to output a clock signal CLKX. The time difference measurement circuit 33 measures the time difference between the clock signal CLKX from the delay circuit 31 and the clock signal CLK1 from the first system module 12 to output the signal DTSS. The delay circuit 32 delays the external clock signal CLK in accordance with the signal DTSS from the time difference measurement circuit 33 to output the clock signal CLKA.

Figure 4:
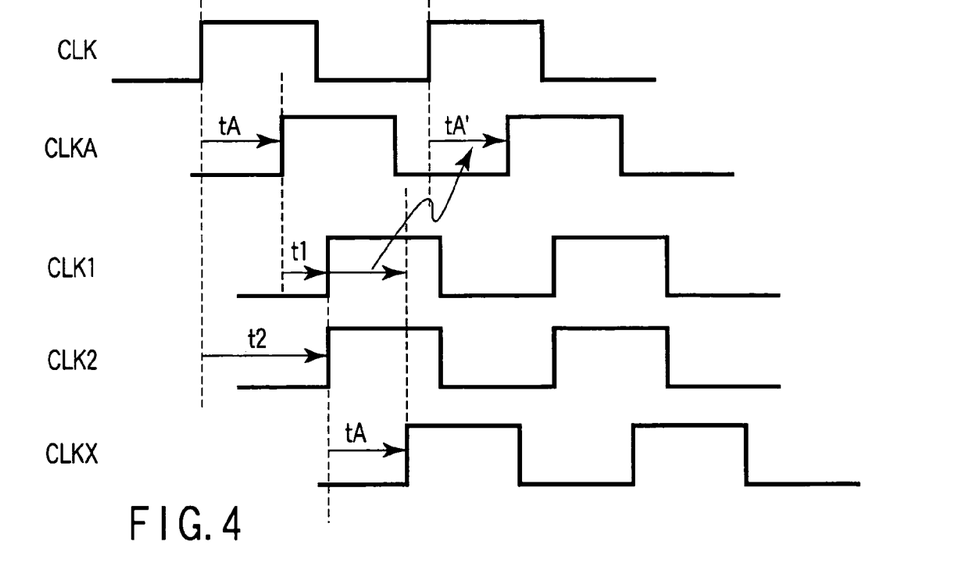
FIG. 4 is a timing diagram illustrating the operation of the delay adjustment circuit shown in FIG. 3.

FIG. 4 illustrates the operating principle of the delay adjustment circuit 17 shown in FIG. 3. The clock signal CLKA output from the delay circuit 32 is delayed in time by tA with respect to the external clock signal CLK. The clock signal CLKA is applied to the first system module 12 and propagates through flip-flop and latch circuits in the first system module, so that it is delayed. The clock signal CLK1 output from the first system module 12 is delayed in time by t1 with respect to the clock signal CLKA. Therefore, the time tY by which the clock signal CLK1 is delayed with respect to the clock signal CLK is given by $$tY=tA+t1$$

On the other hand, the second system module 13 is directly supplied with the external clock signal CLK. The external clock signal is delayed in time by t2 by the second system module 13 and then output as the clock signal CLK2. In the second embodiment, the clock signal CLK2 is applied to the delay circuit 31, then delayed by the same time tA as with the delay circuit 32 and output as the clock signal CLKX. The time tX by which the clock signal CLKX is delayed with respect to the clock signal CLK is given by $$tX=t2+tA$$

The time difference measurement circuit 33 measures the time difference between the clock signal CLK1 and the clock signal CLKX. The time difference tX−tY measured by the time difference measurement circuit 33 is given by $$tX-tY=(t2+tA)-(tA+t1)=t2-t1$$

That is, the ideal value, t2−t1, of the delay time in the delay circuit when the clock signals CLK1 and CLK2 coincide in phase with each other is measured regardless of the value of tA used within one cycle. By using the measured time tA' as the delay time tA for the external clock signal CLK in the next cycle, the skew in the clock signals CLK1 and CLK2 can be minimized.

Figure 5:
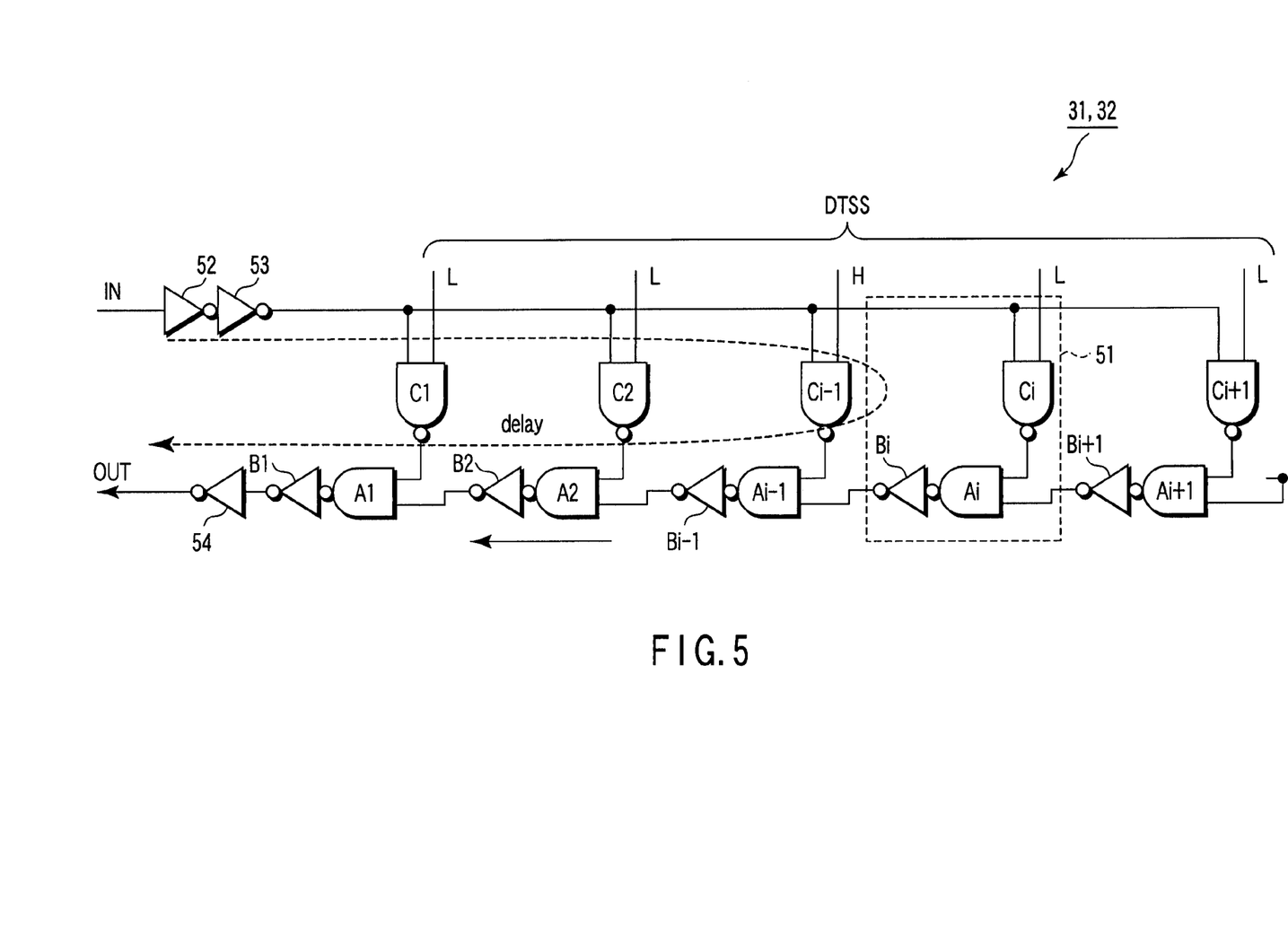
FIG. 5 is a circuit diagram of the delay circuit shown in FIG. 3.

FIG. 5 illustrates an exemplary arrangement of the delay circuits 31 and 32. The delay circuit is constructed from a plurality of unit delay elements 51 connected in parallel between its input and output terminals. Each unit delay element is composed of a NAND circuit Ai, an inverter circuit Bi, and a NAND circuit Ci. In each unit delay element, one input of the NAND circuit Ci is connected to the input terminal through inverter circuits 52 and 53 and the other input is connected to receive the delay time select signal DTSS. The output of the NAND circuit Ci is connected to one input of the NAND circuit Ai, and the other input is connected to the output of the inverter circuit Bi+1 of the immediately succeeding unit delay element. The output of the NAND circuit Ai is connected through the inverter circuit Bi to the other input of the NAND circuit Ai−1 in the immediately preceding unit delay element. The output of the inverter circuit B1 in the unit delay element adjacent to the output terminal is connected to the output terminal through an inverter circuit 54.

In the delay circuits 31 and 32 thus configured, the number of unit delay elements 51 which are connected in parallel is controlled by the delay time select signal DTSS from the time difference measuring circuit 33, whereby a delay time is set. When the logic levels of bits of the delay time select signal DTSS which are applied to the NAND circuits C1, C2, Ci−1, Ci, Ci+1 are "LLHLL" as shown in FIG. 5, only the NAND circuit Ci−1 is enabled, i.e., the (i−1)st unit delay element is selected. Thus, the input clock signal passes through the selected unit delay element and then propagates through the NAND circuit and the inverter circuit in each of the preceding unit delay elements in sequence. Thus, the more unit delay elements the clock signal passes through, the longer the delay time becomes, and vice versa.

The unit delay time per stage can be increased by inserting a buffer between the NAND circuit Ai and the inverter circuit Bi. A measure of unit delay time per stage is less than half of the system skew accuracy. That is, in order to set the skew accuracy of the whole system to less than one nanosecond by way of example, the unit delay time should be set to less than 500 picoseconds. The reason is that, since the skew in the clock signals CLK1 and CLK2 is reduced by adjusting the time difference between the clock signal CLK and the clock signal CLKA through the delay circuit, the skew in the whole system cannot be reduced unless the unit delay time, i.e., the accuracy of the delay circuit, is less than half of the system skew accuracy.

Figure 6:
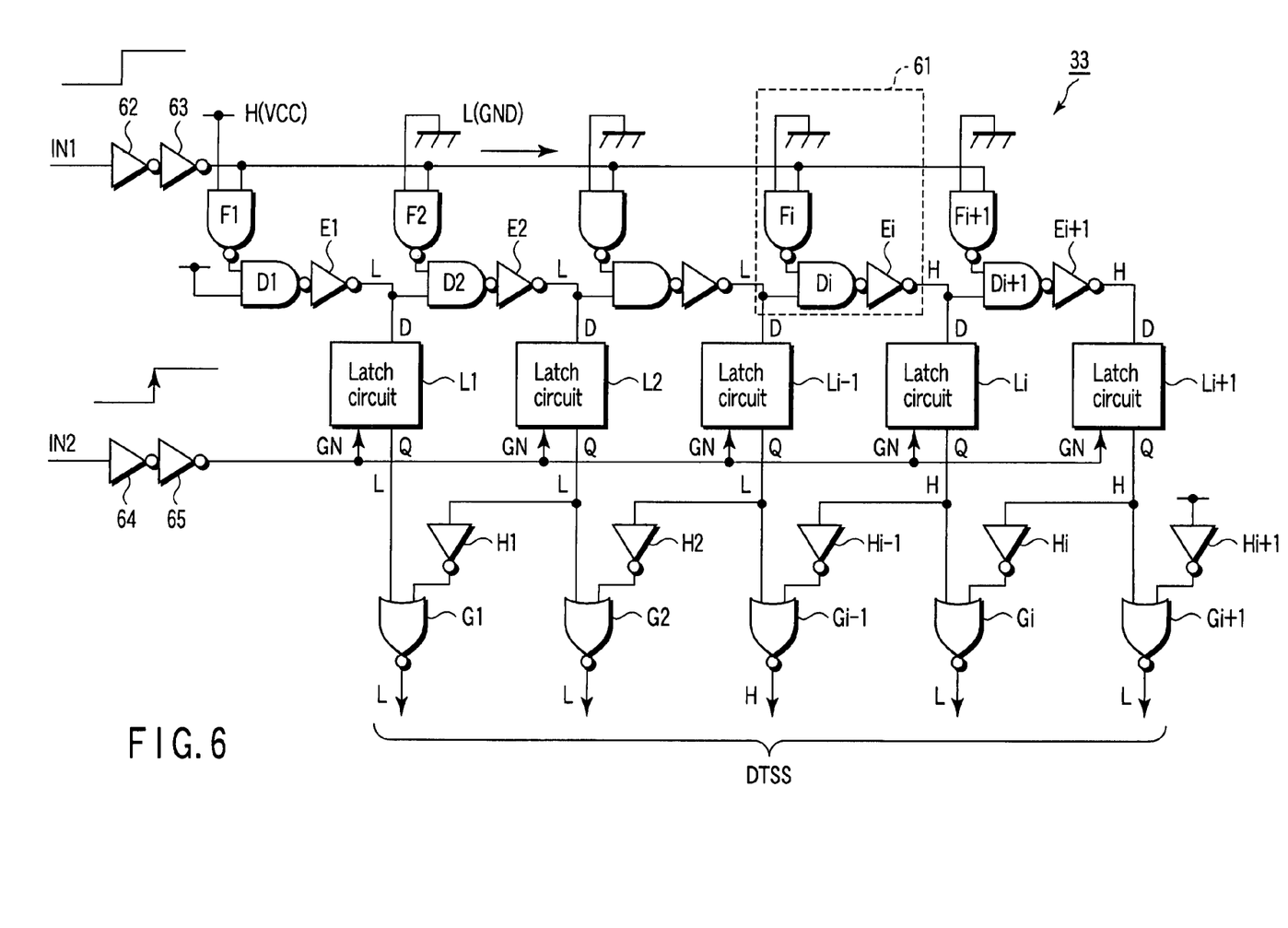
FIG. 6 is a circuit diagram of the time difference measurement circuit shown in FIG. 3.

FIG. 6 shows an exemplary arrangement of the time difference measurement circuit 33. This time difference measurement circuit 33 has first and second input terminals IN1 and IN2 and measures the time interval between the moment that a pulse signal at a high level is applied to the first input terminal IN1 and the moment that the second input terminal IN2 goes to the high level. To this end, the first input terminal IN1 is connected through inverter circuits 62 and 63 to two or more unit delay elements 61. The arrangement of the unit delay element 61 is the same as that of the unit delay element 51 shown in FIG. 5 except input signals to NAND circuits Fi. That is, each unit delay element 61 is composed of NAND circuits Fi and Di and an inverter circuit Ei. One input of the NAND circuit Fi is connected to the output terminal of the inverter circuit 63, and the output is connected to one input of the NAND circuit Di. The other input of the NAND circuit Di is connected to the output terminal of the inverter circuit of the immediately preceding unit delay element. The output terminal of the NAND circuit Di is connected through the inverter circuit Ei to the input terminal of the AND circuit Di+1 of the immediately succeeding unit delay element.

The potential at the other input terminal of the NAND circuit F1 in the first-stage unit delay element is set to the high level (supply voltage VCC). The potential at the other input terminal of each of the other NAND circuits F2, Fi, Fi+1 set to the low level (ground potential VSS). Therefore, when a clock signal at high level is applied to the first input terminal IN1, it is conducted through the inverter circuits 62 and 63 to the other input of the NAND circuit F1, causing its output to go low. Subsequently, upon the lapse of a delay time set by the NAND circuit D1 and inverter circuit E1, the output of the inverter circuit E1 goes low. The pulse signal passes through the NAND circuit D2 and the inverter circuit E2 in the succeeding unit delay element. Thus, the output of the inverter in each of the unit delay elements goes low in sequence with time.

The output terminal of the inverter circuit Ei in each unit delay element is connected to the input terminal D of a corresponding latch circuit Li. The input terminal GN of each latch circuit Li is connected to the second input terminal IN2 through inverter circuits 64 and 65. The output terminal Q of each latch circuit Li is connected to one input of a corresponding NOR circuit Gi, the other input terminal of which is connected through an inverter circuit Hi to the output terminal Q of the succeeding latch circuit Li+1. The latch circuit Li outputs the level at the input terminal D when the input terminal GN goes from low to high level to the output terminal Q and holds it.

In the time difference measurement circuit thus configured, when a clock signal at high level is applied to the second input terminal IN2, the output state of the inverter Ei is latched by the corresponding latch circuit Li. That is, in a state where the pulse signal has passed through the i-th unit delay element, the outputs of the inverter circuits E1 through Ei−1 have gone low and the outputs of the succeeding inverter circuits Ei and Ei+1 have gone high. When, in this state, the potential at the second input terminal IN2 goes high, the outputs of the latch circuits Li through Li−1 go low and the outputs of the succeeding latch circuits Li and Li+1 go high. Thus, only the i-1th delay time select signal DTSS is made high through the NOR circuit Gi−1 connected to the output Q of the latch circuit Li−1 and the inverter circuit Hi−1.

According to the second embodiment, the time difference measurement circuit 33 measures the time difference between the clock signal CLK1 output from the first system module 12 and the clock signal CLK2 output from the second system module 13 and the delay circuit 32 delays the external clock signal CLK according to the detected time difference to output the clock signal CLKA for driving the first system module 12. For this reason, even in the event that the operating conditions and drive voltage of the first system module 12 have changed, the clock skew in the clock signals of the first and second system modules 12 and 13 can be minimized. It therefore becomes possible to improve the setup/hold characteristics for data communications between the first and second system modules 12 and 13.

Moreover, the delay adjustment circuit 17 optimizes the amount of delay one clock cycle later, thus allowing the clock skew to be improved at high speed.

Figure 7:
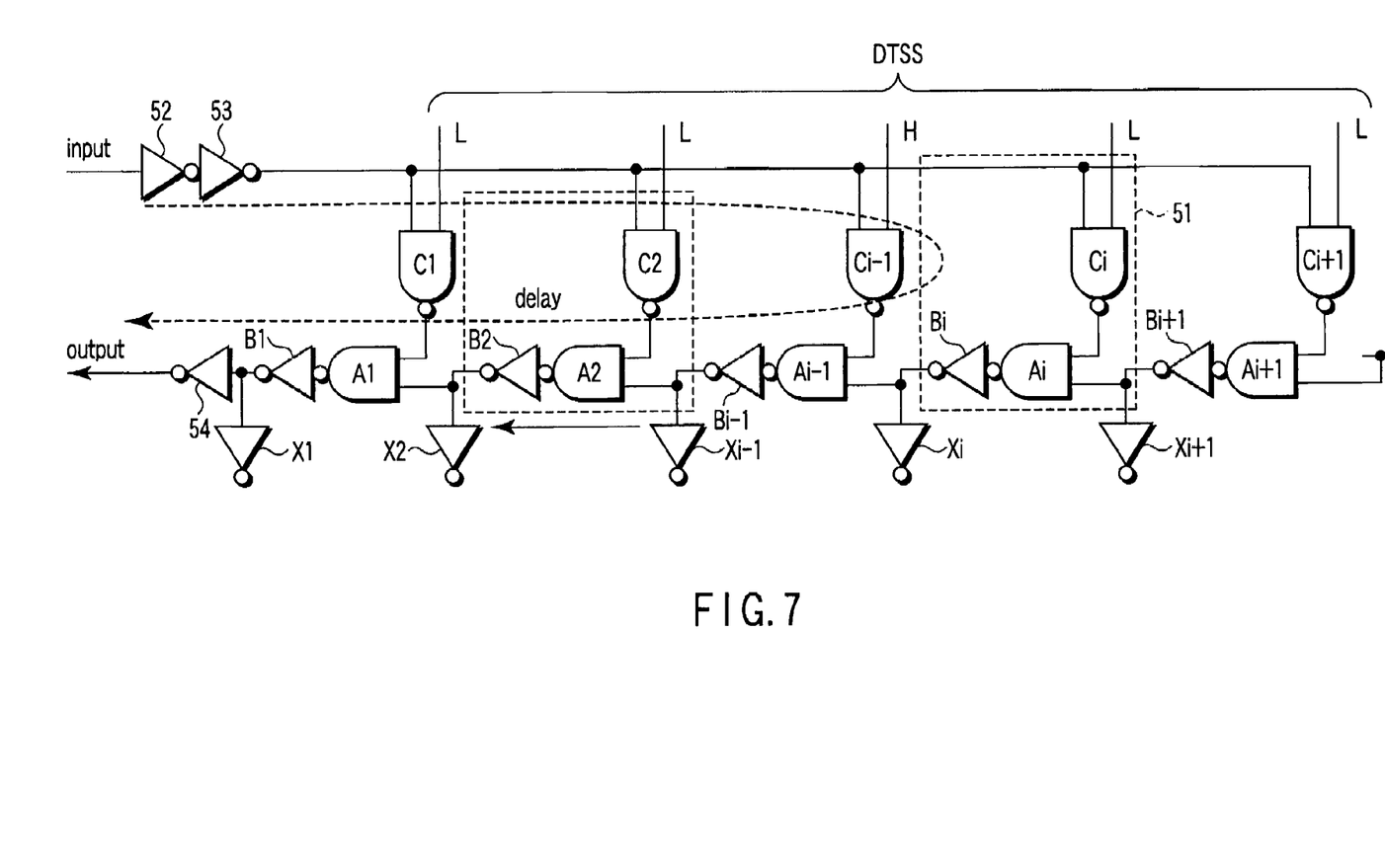
FIG. 7 is another circuit diagram of the time difference measurement circuit shown in FIG. 3.

FIG. 7 shows a modification of the delay circuit according to the second embodiment. In FIG. 7, corresponding parts to those in FIG. 5 are denoted by like reference numerals and only different parts will be described. It is desirable that each unit delay element comprising the delay circuit and each unit delay element comprising the time difference measurement circuit 33 have the same delay time. However, the output terminal of each unit delay element comprising the time difference measurement circuit 33 is connected to a latch circuit. The capacitive load of this latch circuit will make the unit delay element in the time difference measurement circuit 33 different in delay time from the unit delay element in the delay circuit 31, 32.

As shown in FIG. 7, the output terminal of each unit delay element comprising the delay circuit is connected to a capacitive load equivalent to the latch circuit. That is, the output terminals of the inverter circuits B1 to Bi+1 are connected to the input terminals of inverter circuits X1 to Xi+1,respectively. The output terminal of each of the inverter circuits X1 to Xi+1 is made open.

According to the arrangement shown in FIG. 7, the delay time of each unit delay element in the delay circuit 31, 32 can be made equal to that in the time difference measurement circuit 33. For this reason, skew in the clock signals CLK1 and CLK2 can be further reduced.

As another modification, an inverter circuit, similar to Xi in FIG. 7, may be inserted between the output of each inverter circuit Ei and the input of the corresponding latch circuit Li in the time difference measurement circuit 33 of FIG. 6, thereby allowing each unit delay element in the time difference measurement circuit and the delay circuits 31 and 32 to have exactly the same capacitive load.

In the second embodiment, the output signals of the respective unit delay elements are held through the use of latch circuits corresponding in number to the delay elements. Further, flip-flop circuits may be combined for an application in which the output signals of the respective unit delay elements are held for two or more cycles and averaged.

The result of the time difference measurement circuit 33 obtained in one cycle may be used two cycles later, not for the delay time in the next cycle.

The use of such modifications will allow the time difference between the clock signals CLK1 and CLK2 to be measured more accurately.

[Third Embodiment]

Figure 8:
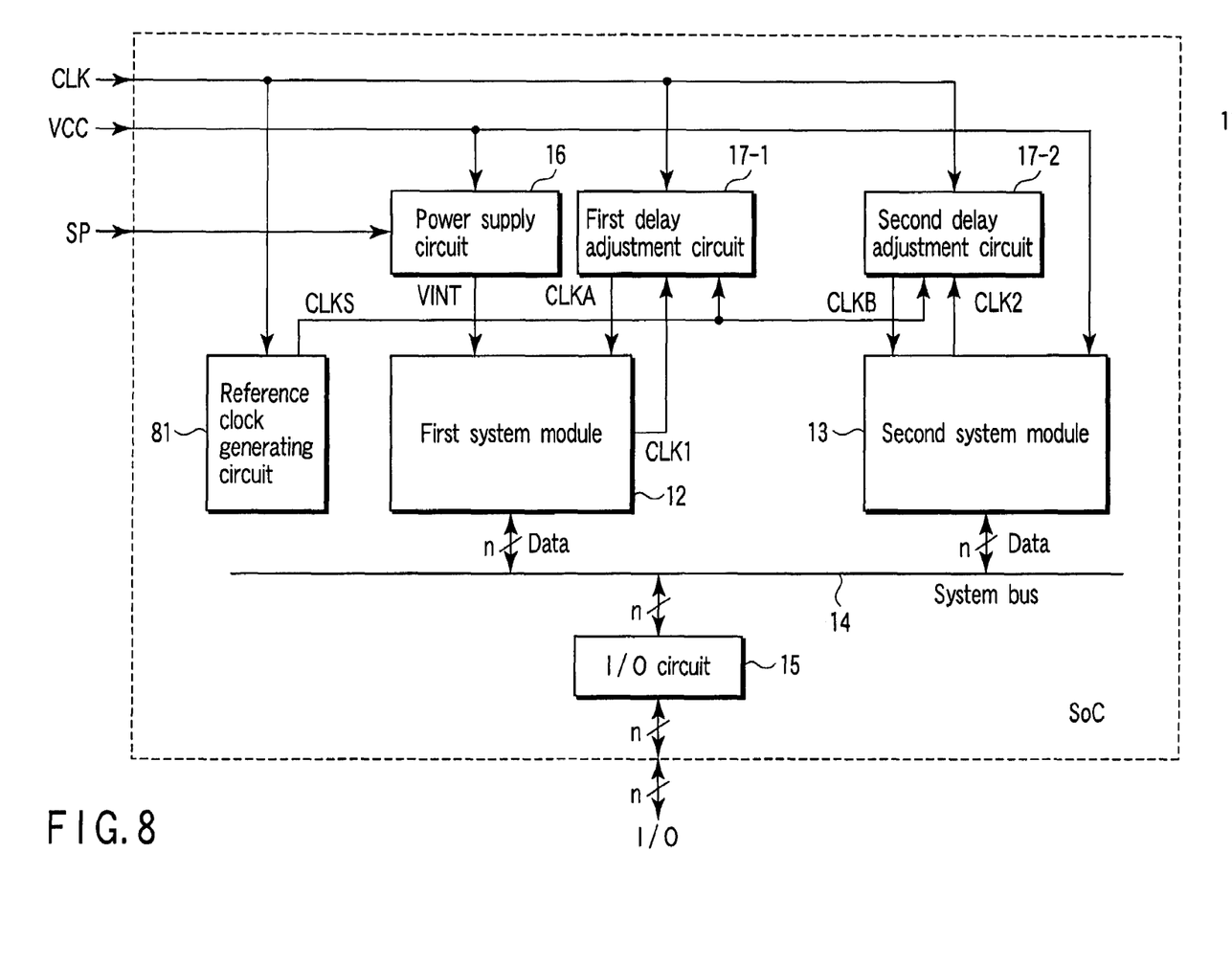
FIG. 8 is a schematic block diagram of a third embodiment of the present invention.

FIG. 8 shows a third embodiment of the present invention. In the first and second embodiments, the delay adjustment circuit 17 makes a comparison between the clock signals CLK1 and CLK2 supplied from the first and second system modules 12 and 13. In the first and second embodiments, only the clock signal from the first system module is controlled. In contrast to the first and second embodiments, in the third embodiment, a reference clock signal is produced inside the chip, the phase or time difference between each of the clock signals CLK1 and CLK2 and the reference clock signal is detected, and clock signals applied to the first and second modules 12 and 13 are controlled accordingly.

That is, in FIG. 8, a reference clock signal generating circuit 81 is provided in the SoC device 11. The reference clock generating circuit 81 produces a reference clock signal CLKS from the external clock signal CLK. The reference clock signal CLKS is a clock signal in which the time required for clock signals to propagate in two or more system modules is standardized, for example, a clock signal which has the average delay time of clock signals in two or more system modules. First and second delay adjustment circuits 17-1 and 17-2 are provided for the first and second system modules 12 and 13, respectively. The first and second delay adjustment circuits 17-1 and 17-2 may be configured as shown in FIGS. 9 and 10, which correspond to FIGS. 2 and 3, respectively.

Figure 9:
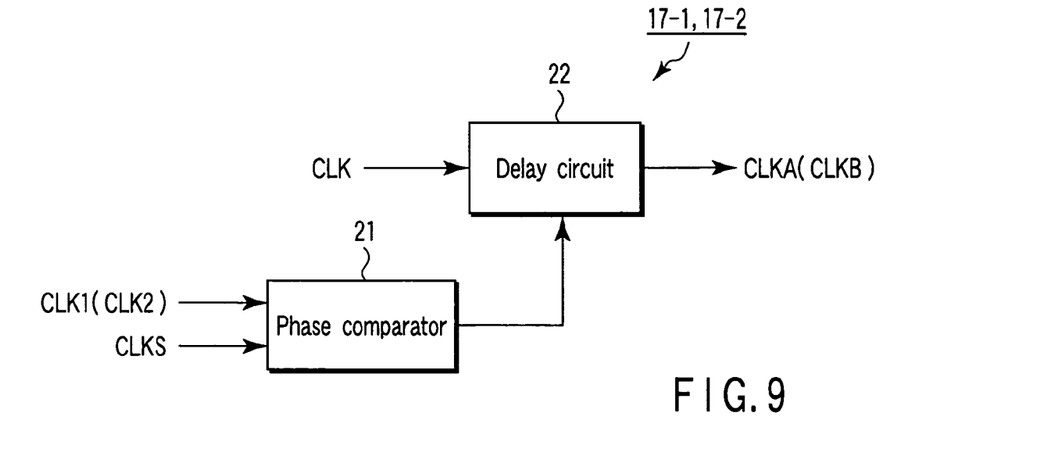
FIG. 9 is a block diagram of the delay adjustment circuit applied to the third embodiment.

When the first delay adjustment circuit 17-1 is configured as shown in FIG. 9, the phase comparator 21 makes a comparison in phase between the clock signal CLK1 from the first system module 12 and the reference clock signal CLKS from the reference clock generator 81. The delay circuit 22 delays the external clock signal CLK according to the result of the comparison by the phase comparator 21 and produces the clock signal CLKA for driving the first system module 12.

With the second delay adjustment circuit 17-2 configured as shown in FIG. 9, the phase comparator 21 makes a comparison in phase between the clock signal CLK2 from the second system module 13 and the reference clock signal CLKS. The delay circuit 22 delays the external clock signal CLK according to the result of comparison by the phase comparator 21 to produce the clock signal CLKB for driving the second system module 13.

Figure 10:
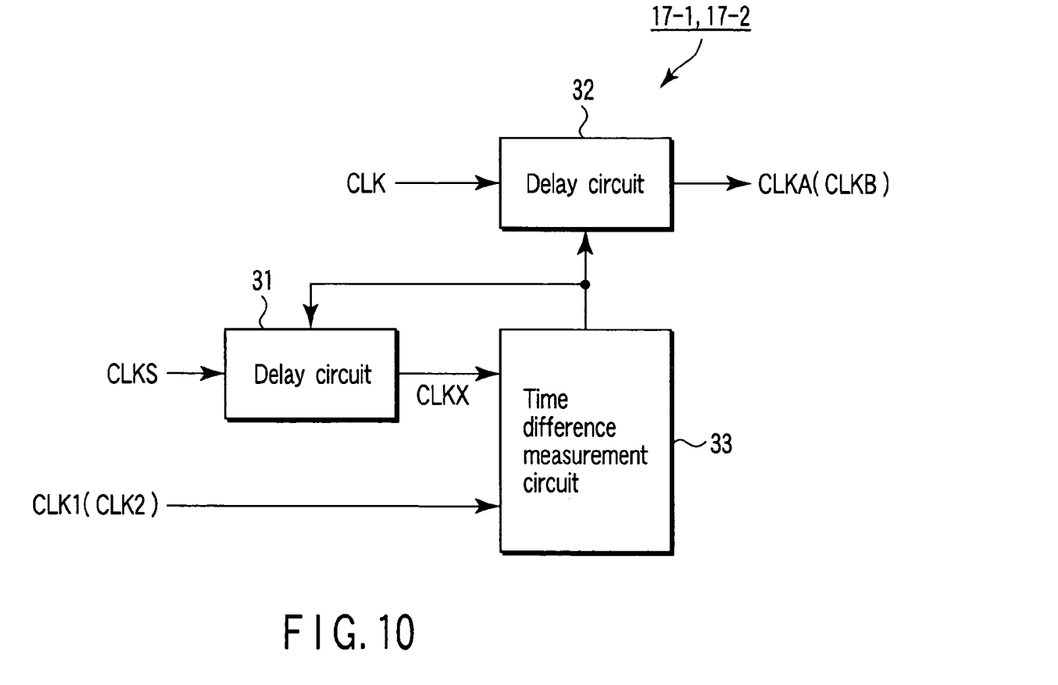
FIG. 10 is another block diagram of the delay adjustment circuit applied to the third embodiment.

With the first delay adjustment circuit 17-1 configured as shown in FIG. 10, on the other hand, the delay circuit 31 delays the reference clock signal CLKS under control of the time difference measurement circuit 33. The time difference measurement circuit 33 measures the time difference between the clock signal CLKX from the delay circuit 31 and the clock signal CLK1 from the first system module 12. The delay circuit 32 delays the external clock signal CLK according to the measurement by the time difference measurement circuit 33 to produce the clock signal CLKA for driving the first system module 12.

With the second delay adjustment circuit 17-2 configured as shown in FIG. 10, the delay circuit 31 delays the reference clock signal CLKS under control of the time difference measurement circuit 33. The time difference measurement circuit 33 measures the time difference between the clock signal CLKX from the delay circuit 31 and the clock signal CLK2 from the second system module 13. The delay circuit 32 delays the external clock signal CLK according to the measurement by the time difference measurement circuit 33 to produce the clock signal CLKB for driving the second system module 13.

According to the third embodiment, the first delay adjustment circuit 17-1 measures the phase or time difference between the clock signal CLK1 from the first system module 12 and the reference clock signal CLKS and outputs the clock signal CLKA to drive the first system module accordingly. For this reason, skew in the clock signals CLK1 and CLKS can be minimized. The second delay adjustment circuit 17-2 measures the phase or time difference between the clock signal CLK2 from the second system module 13 and the reference clock signal CLKS and outputs the clock signal CLKB to drive the second system module accordingly. For this reason, skew in the clock signals CLK2 and CLKS can be minimized. Thus, since each of the clock signals CLK1 and CLK2 is minimized in skew with respect to the reference clock signal CLKS, skew in the clock signals CLK1 and CLK2 can also be minimized. Even in the event of a change in the operating state or drive voltage of the first system module 12, therefore, clock skew in the whole system can be maintained minimum and the operating margin of flip-flop and latch circuits contained in the first and second system modules 12 and 13 can be secured.

Although, in the third embodiment, skew in clock signals for two system modules is adjusted, this is not restrictive. It is also possible to adjust skew in clock signals for three or more system modules.

Although only the operating voltage of the first system module 12 is adjusted by the power supply circuit 16, two or more modules may have their respective operating voltages adjusted by the power supply circuit. Moreover, the operating voltage produced by the power supply circuit 16 may vary with the system operating state.

However, since the delay adjustment circuits 17-1 and 17-2 optimize the amount of delay one cycle later, it is not desirable that the operating voltage changes abruptly and consequently the propagation time of the clock signal in the system module changes greatly with each clock cycle. For this reason, when the system skew accuracy is, say, one nanosecond, it is recommended that the voltage be changed so that the propagation time of the clock signal will not vary more than 500 picoseconds per cycle. In addition, when the system skew accuracy is 200 picoseconds, it is desirable that a change in the clock signal propagation time per cycle be less than 100 picoseconds.

[Fourth Embodiment]

Figure 11:
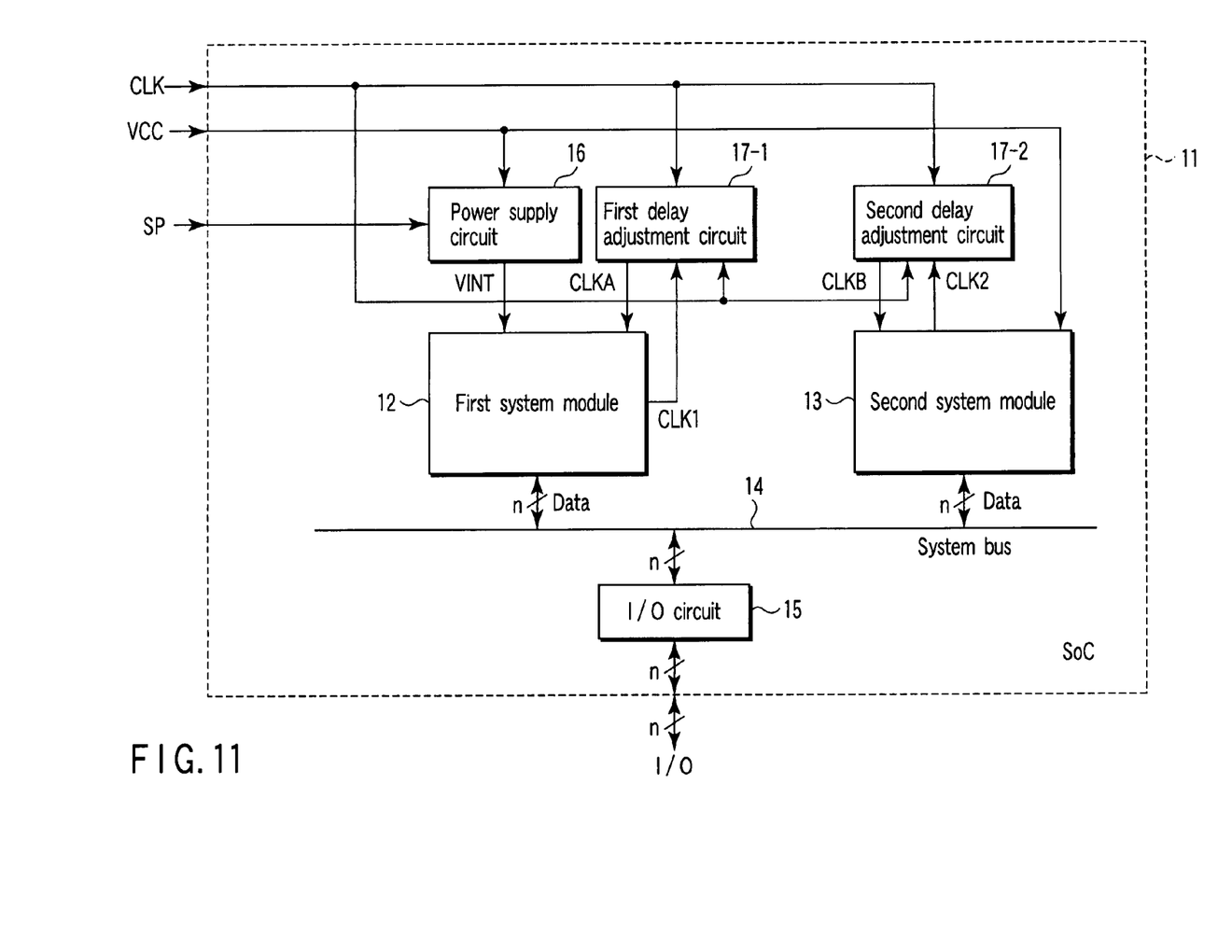
FIG. 11 is a schematic block diagram of a fourth embodiment of the present invention.

FIG. 11 shows a fourth embodiment of the present invention which is a modification of the third embodiment. In the third embodiment, the reference clock generating circuit 81 is incorporated into the SoC device 11 and each of the first and second delay adjustment circuits 17-1 and 17-2 adjusts the delay time introduced into the transmission of the external clock signal CLK on the basis of the phase or time difference between the reference clock signal CLKS from the reference clock generating circuit and a corresponding one of the clock signals CLK1 and CLK2 from the first and second system modules 12 and 13.

Unlike the third embodiment, in the fourth embodiment, the reference clock signal generating circuit is omitted. Each of the first and second delay adjustment circuits 17-1 and 17-2 adjusts the delay time introduced into the transmission of the external clock signal CLK on the basis of the phase or time difference between the external clock signal CLK as the reference clock signal and a corresponding one of the clock signals CLK1 and CLK2 from the first and second system modules 12 and 13.

The fourth embodiment can also provide the same advantages as the third embodiment.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A semiconductor device comprising:
   a first logic circuit which has its supply voltage controlled;
   a second logic circuit which operates in response to an external clock signal;
   an adjustment circuit including a detection circuit and a first delay circuit supplied with the external clock signal, the detection circuit detecting a skew between timings of a first clock signal output from the first logic circuit and a second clock signal output from the second logic circuit and adjusting the delay time of the first delay circuit according to the result of the detection, and the first delay circuit applying an output signal to the first logic circuit as a third clock signal,
   wherein the detection circuit includes a second delay circuit adapted to delay the second clock signal in time to output a fourth clock signal, and a measurement circuit connected to receive the fourth clock signal output from the second delay circuit and the first clock signal to measure a time difference between the first and fourth clock signals and output a control signal which is a function of the time difference, and the delay time of the first and second delay circuits are controlled in accordance with the control signal from the measurement circuit.

2. The device according to claim 1, wherein the detection circuit has a phase comparator adapted to compare the phases of the first and second clock signals and output a control signal which is a function of the result of the comparison and adjusts the delay time of the first delay circuit according to the control signal output from the phase comparator.

3. The device according to claim 1, further comprising a power supply circuit which controls the supply voltage of the first logic circuit section.

4. The device according to claim 1, wherein the first delay circuit has a plurality of first unit delay elements connected between an input terminal connected to receive the external clock signal and an output terminal from which the third clock signal is output, the conduction of each of the first unit delay elements being controlled in accordance with the control signal.

5. The device according to claim 1, wherein the measurement circuit includes a first delay element group in which a plurality of second unit delay elements are connected in series to a first input terminal connected to receive the first clock signal, a plurality of latch circuits each of which is connected to the output of a respective one of the second unit delay elements and holds its output signal in response to the fourth clock signal, and a logic circuit connected to receive the output signals of the respective latch circuits to produce the control signal.

6. The device according to claim 5, further comprising load circuits each of which is connected to the output terminal of a respective one of the first unit delay elements and has an input capacitance substantially equal to that of the latch circuit.

7. A semiconductor device comprising:
a first logic circuit which has its supply voltage controlled and outputs a first clock signal;
a second logic circuit which outputs a second clock signal;
a first adjustment circuit including a first detection circuit and a first delay circuit supplied with an external clock signal, the first detection circuit detecting a skew between timings of the first clock signal output from the first logic circuit and a reference clock signal and adjusting the delay time of the first delay circuit according to the result of the detection, and the first delay unit applying an output signal of the first delay circuit to the first logic circuit as a third clock signal; and
a second adjustment circuit including a second detection circuit and a second delay circuit supplied with the external clock signal, the detection circuit detecting a skew between timing of the second clock signal output from the second logic circuit and the reference clock signal and adjusting the delay time of the second delay circuit according to the result of the detection, and the second delay circuit applying an output signal of the second delay circuit to the second logic circuit as a fourth clock signal.

8. The device according to claim 7, further comprising a reference clock generating circuit responsive to the external clock signal to produce the reference clock signal.

9. The device according to claim 7, wherein the first detection circuit has a first phase comparator adapted to compare the phases of the first and reference clock signals and adjusts the delay time of the first delay circuit according to an output signal of the first phase comparator.

10. The device according to claim 7, wherein the second detection circuit has a second phase comparator adapted to compare the phases of the second and reference clock signals and adjusts the delay time of the second delay circuit according to an output signal of the second phase comparator.

11. The device according to claim 7, further comprising a power supply circuit which controls the supply voltage of the first logic circuit section.

12. The device according to claim 7, wherein the second detection circuit includes a fourth delay circuit adapted to delay the reference clock signal in time to output a sixth clock signal, and a second measurement circuit connected to receive the sixth clock signal output from the fourth delay circuit and the second clock signal to measure a time difference between the reference and sixth clock signals and output a second control signal which is a function of the time difference, and the delay time of second and the fourth delay circuits are controlled in accordance with the second control signal from the second measurement circuit.

13. The device according to claim 12, wherein the second measurement circuit includes a second delay element group having its one end connected to receive the second clock signal, and a plurality of fourth unit delay elements connected in series, a plurality of second latch circuits each of which is connected to the output of a respective one of the fourth unit delay elements and holds its output signal in response to the reference clock signal, and a second logic circuit connected to receive the output signals of the respective second latch circuits to produce the second control signal.

14. The device according to claim 12, wherein the second delay circuit has a plurality of second unit delay elements connected between an input terminal connected to receive the external clock signal and an output terminal from which the fourth clock signal is output, the conduction of each of the second unit delay elements being controlled in accordance with the second control signal.

15. The device according to claim 7, wherein the first detection circuit includes a third delay circuit adapted to delay the reference clock signal in time to output a fifth clock signal, and a first measurement circuit connected to receive the fifth clock signal output from the third delay circuit and the first clock signal to measure a time difference between the reference and fifth clock signals and output a first control signal which is a function of the time difference, and the delay time of the first and the third delay circuits are controlled in accordance with the first control signal from the first measurement circuit.

16. The device according to claim 15, wherein the first measurement circuit includes a first delay element group having its one end connected to receive the first clock signal and including a plurality of third unit delay elements connected in series, a plurality of first latch circuits each of which is connected to the output of a respective one of the third unit delay elements and holds its output signal in response to the reference clock signal, and a first logic circuit connected to receive the output signals of the respective first latch circuits to produce the first control signal.

17. The device according to claim 15, wherein the first delay circuit has a plurality of first unit delay elements connected between an input terminal connected to receive the external clock signal and an output terminal from which the third clock signal is output, the conduction of each of the first unit delay elements being controlled in accordance with the first control signal.

18. The device according to claim 17, further comprising load circuits each of which is connected to the output terminal of a respective one of the second unit delay elements and has an input capacitance substantially equal to that of the latch circuit.

19. The device according to claim 17, further comprising load circuits each of which is connected to the output terminal of a respective one of the first unit delay elements and has an input capacitance substantially equal to that of the latch circuit.

* * * * *